United States Patent [19]

Dunaway et al.

[11] Patent Number: 4,976,786
[45] Date of Patent: Dec. 11, 1990

[54] METHOD FOR FORMING AGGREGATED KAOLIN PIGMENT

[75] Inventors: Weyman H. Dunaway, Sandersville; Lev F. Verbov, Milledgeville, both of Ga.

[73] Assignee: ECC America Inc., Atlanta, Ga.

[21] Appl. No.: 416,936

[22] Filed: Oct. 4, 1989

[51] Int. Cl.$^5$ ............................................. C04B 14/10
[52] U.S. Cl. .................... 106/416; 106/485; 106/486; 106/488; 501/144; 501/147
[58] Field of Search ............... 106/485, 486, 488, 416; 501/144, 145, 146, 147

[56] References Cited

U.S. PATENT DOCUMENTS

| | | |
|---|---|---|
| 3,616,900 | 11/1971 | Cecil et al. . |
| 3,655,038 | 4/1972 | Mercede . |
| 3,661,515 | 5/1972 | Iannicelli et al. . |
| 3,674,521 | 7/1972 | Noble ............................... 106/488 X |
| 3,765,825 | 10/1973 | Hurst . |
| 3,769,383 | 10/1973 | Hurst . |
| 3,837,877 | 9/1974 | Bertorelli ............................ 106/485 |
| 4,075,280 | 2/1978 | Fitton et al. . |
| 4,499,062 | 2/1985 | Christophliemk et al. . |
| 4,816,074 | 3/1989 | Raythatha et al. . |

FOREIGN PATENT DOCUMENTS 1084478 8/1980 Canada .
14603 3/1974 Sweden .

Primary Examiner—Karl Group
Attorney, Agent, or Firm—Klauber & Jackson

[57] ABSTRACT

A method for forming a hydrothermally aggregated kaolin clay pigment, comprising preparing an aqueous slurry of particulate kaolin clay and sodium aluminate, having a total solids concentration of from about 2 to 25% by weight, the weight ratio between kaolin and aluminate being greater than 1; and hydrothermally treating the slurry in a closed system to form aggregates of adherent kaolin platelets.

24 Claims, 4 Drawing Sheets

METHOD FOR FORMING AGGREGATED KAOLIN PIGMENT

FIELD OF THE INVENTION

This invention relates to the preparation of aggregated pigments from kaolin clays by relatively low temperature hydrothermal treatment. Further, it relates to oxidative bleaching during hydrothermal treatment for producing bulking pigments.

BACKGROUND OF THE INVENTION

In U.S. Pat. No. 4,075,280 issued Feb. 21, 1978 to R. C. Fitton et al (assigned to J. M. Huber Corp.) there is disclosed a process for preparation of zeolites such as zeolite A having increased ion exchange capacities, and improved usefulness in detergent and water purification applications, which comprises reaction of a calcined clay under conditions of high shear in contact with a portion of an alkali metal hydroxide solution, thereafter gradually increasing the temperature of the resulting mixture while adding the additional amount of alkali metal hydroxide solution under conditions of high shear, and recovering the zeolite product.

The reaction of sodium silicate with kaolin clays has been studied under various hydrothermal conditions, as reported by Kurbus et al, Z. Anogr. Allg. Chem., 1977, Volume 429, pages 156–161. These reactions were studied under hydrothermal conditions using essentially equivalent molar ratios of the kaolin and sodium silicate with the reaction being carried out in an autoclave. The products of the reactions, as identified by x-ray, electron microscope, and infrared methods, showed that sodium silicate reacts with kaolin to form an aluminosilica gel or a crystallized zeolite mineral analcime of the formula:

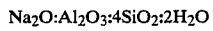

$$Na_2O:Al_2O_3:4SiO_2:2H_2O$$

In the reaction, the kaolin dissolves and alpha-quartz simultaneously appears in the product of reaction.

U.S. Pat. No. 4,812,299 issued Mar. 14, 1989 to S. K. Wason (assigned to J. M. Huber Corp.) describes compositions designated as synthetic alkali metal aluminosilicates, or simply SAMS, prepared by the hydrothermal reaction of an alkali metal silicate and kaolin clay. By the term "hydrothermal" it is meant that the reaction is carried out under aqueous conditions of elevated temperatures and pressures of greater than atmospheric. The preferred temperatures range from 140°–250° C. The preferred pressure conditions comprise pressures ranging from 50 to 360 psig. The reaction is conducted under conditions of agitation. In a preferred operation of the said process, the aqueous slurry of the starting clay material and the alkali metal silicate is formed, the system is closed and heat applied to gradually raise the temperature. In general, the pressure in the system will range from about 50 to 360 psig at temperatures ranging from about 140 to 250 degrees C. A specifically preferred range of conditions is to operate the process at pressures of 100 to 200 psig and temperatures of 164 to 194 degrees C. The temperatures are preferably correlated to the pressure such as that provided by steam. The reaction time is about 0.25 to 4 hours. After completion of the reaction, heat is removed and the mixture is allowed to cool, after which the system is opened, the product separated by filtration or centrifugation, washed with water, and dried. Spray drying is preferred at inlet temperatures of 1000° F. (538° C.) and outlet temperature of 250° F. (121° C.). The products are defined as structured agglomerates wherein the primary particles comprise altered kaolin clay platelets integrated with one or more adjacent areas of essentially amorphous alkali metal silicate base-kaolin clay reaction products. More specifically, they are described as altered kaolin platelets having an integrated rimmed area of amorphous, non-diffracting alkali metal silicate-kaolin reaction product. The products are said to be useful as reinforcing agents or fillers for papers, paints, plastics and rubber and to have increased opacity and brightness as compared with the starting clay material.

U.S. Pat. No. 4,816,074 issued Mar. 28, 1989 to Rasik H. Ravthatha et al, assigned to E.C.C. America Inc., describes a process in which a structured aggregated kaolin pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. The product is useful as a pigment in the coating or filling of paper. The process serves to aggregate the very fine particles (i.e. the sub 0.25 micrometer particles) present in very fine feeds. Thus, the otherwise large percentages of troublesome extremely fine particles are effectively removed as separate entities, but without the need for separation steps, together with the costly equipment required for such operations.

In U.S. Pat. Nos. 3,655,038; 3,616,900 and 3,661,515, also Swedish patent No. 14603, there are disclosed methods of improving the brightness of contaminated kaolin clays by treatment with an oxidizing agent.

U.S. Pat. No. 3,765,825 issued Oct. 16, 1973 to V. J. Hurst teaches reducing the viscosity of kaolin clay slurries by hydrothermal treatment. In U.S. Pat. No. 3,769,383 issued Oct. 30, 1973, he teaches hydrothermal treatment of kaolin to produce a variety of alumino-silicate products.

U.S. Pat. No. 4,499,062 issued Feb. 12, 1985 to P. Christoohliemk et al (assigned to Henkel) teaches hydrothermal decomposition of industrial waste products such as filter sludge containing aluminum silicate and-/or alkali aluminum silicate, by addition of aqueous NaOH solution and sand.

Canadian Patent No. 1084478 issued Aug. 26, 1980 to M. P. Jameson et al (assigned to Engelhard Minerals and Chemicals Corp.) relates to the preparation of ion-exchange zeolites by the reaction of calcined kaolin clay with a source of alkali metal oxide, in which metakaolin is first chlorinated at a temperature in the range of 600° to 980° C. to volatilize iron impurities before carrying out said reaction.

SUMMARY OF THE INVENTION

An object of the invention is to prepare aggregated pigments from uncalcined kaolin clay useful in paper fillers and coatings.

Now in accordance with the present invention, the foregoing objects, and others as will become apparent in the course of the ensuing specification, are achieved in a method which enables low temperature hydrothermal aggregation of kaolin. In the practice of the invention an aqueous slurry of particulate kaolin clay and sodium aluminate is prepared, having a total solids concentration of from about 2 to 25% by weight, the weight ratio between kaolin and aluminate being greater than 1. The slurry is then hydrothermally treated in a closed system to form aggregates of adherent kaolin platelets. The hydrothermal treatment is generally effected at temperatures of from about 50° to 300° C., with a more preferable temperature being in the range of from about 90° to 200° C. Pressure conditions in the closed system correspond to saturated steam at the temperature utilized.

The slurry is subjected to mixing during the hydrothermal treatment, with such treatment being carried out for from about 0.1 to 8 hours; and preferably for from about 0.1 to 2 hours.

In a further aspect of the invention, it has been found that generally lower temperatures can be used during the hydrothermal reaction, where the slurry further includes sodium silicate. Where so used, the molar ratio between the sodium aluminate (expressed as equivalent $Al_2O_3$) and sodium silicate (expressed as equivalent $SiO_2$) is from about 1:2 to 2:1. Following the hydrothermal reaction, the resultant aggregates are recovered and dried.

Wide varieties of clays can be processed including inferior, low grade clays which may be unsuitable for calcination. Discolored clays having low brightnesses can also be used as feed for the present processes, and unexpectedly brightened pigments are thereby yielded.

According to a further aspect of the invention, increased brightness of aggregated products during the hydrothermal treatment can be achieved by conducting the hydrothermal treatment under an oxidizing atmosphere. Oxygen or other oxidizing gases and/or oxidative bleaching compounds such as peroxides, permanganates or the like, can be employed.

The method can comprise the following steps:

(1) preparation of a slurry containing the kaolin clay, sodium aluminate (and if used, sodium silicate) and water;

(2) bubbling oxygen through the slurry for 1-10 min. at room temperature and atmospheric pressure in a reactor;

(3) sealing the reactor and (optionally) applying additional oxygen pressure of above 0 to 200 psi;

(4) heating the slurry to the previously mentioned temperature and pressures, while maintaining mixing. Other bleaching means may be used such as oxidative bleaching compounds, e.g., peroxide, permanganate, etc.

DESCRIPTION OF PREFERRED EMBODIMENT

Practice of the present invention will now be illustrated by Examples which are deemed illustrative of both the process taught by the present invention, and of the products yielded in accordance with the invention:

EXAMPLE 1

A mixture containing 90 grams of a water-washed grey kaolin whose particles are 90% by weight less than 0.5 micrometers, 133 grams of a 45% sodium aluminate/water solution (VSA-45, Vinings Industries, Atlanta, Ga.) and an additional 1277 grams of water, was heated in a 2 liter Parr high pressure reactor vessel until the reactor's temperature of 230° C. was reached. This temperature was held for 50 minutes with stirring at 500 rpm, at which time the reactor was cooled to room temperature by circulating cool water through a coil built into the reactor.

Figure 1:
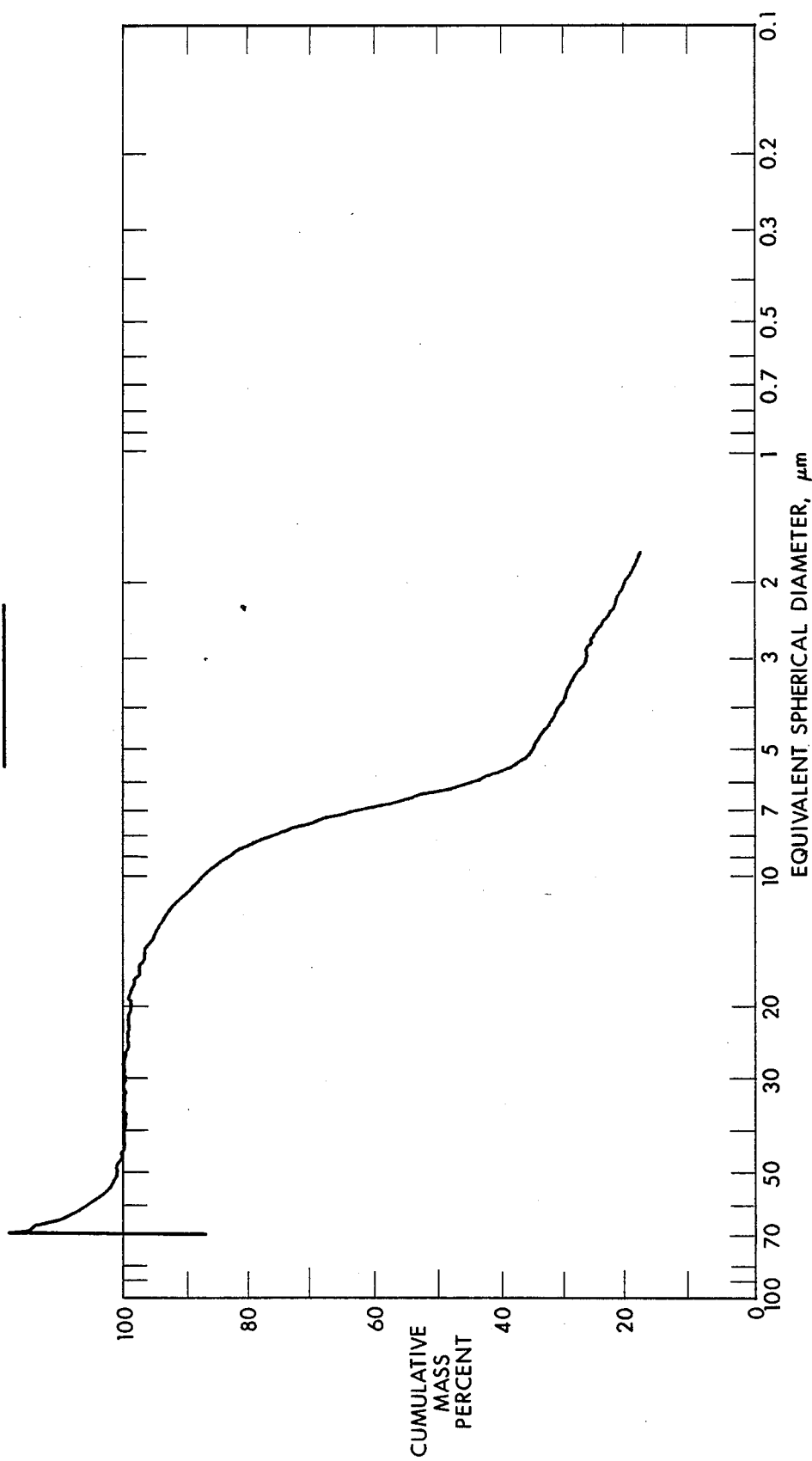
FIG. 1 is a particle size distribution (PSD) curve for the product of Example 1 herein.
Figure 2:
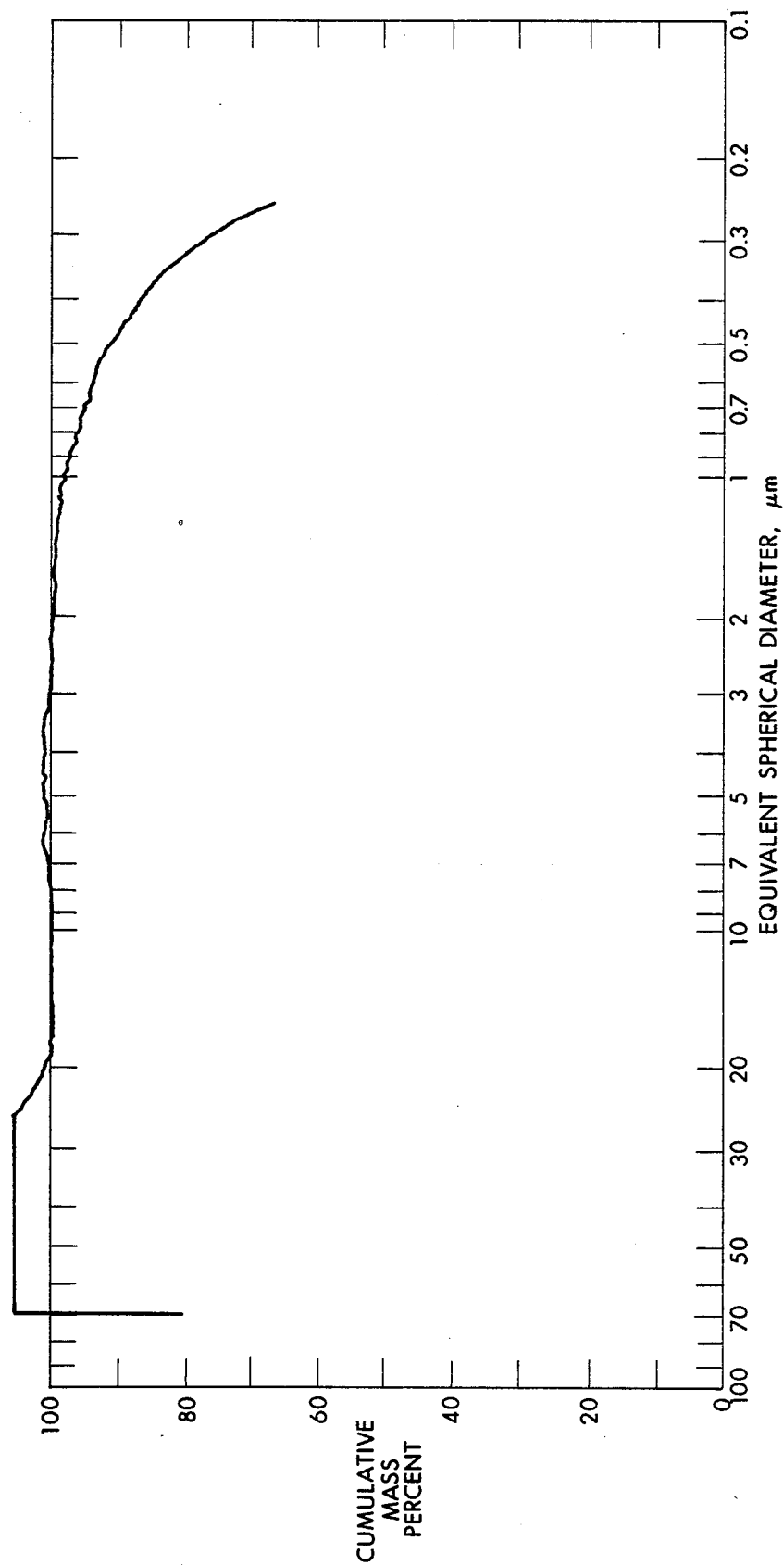
FIG. 2 is a PSD curve for the feed material used in Example 1.

The product was removed from the reactor, filtered on a No. 4 Whatman filter paper and dried overnight at 110° C. in a circulating air oven. The dried product was pulverized three times using a Raymond mill. This resulting aggregate had an average particle size of 6.2μ which is considerably altered from the original unaggregated material. Particle size distribution curves of the starting material and final material are given in FIGS. 2 and 1.

EXAMPLE 2

Figure 3:
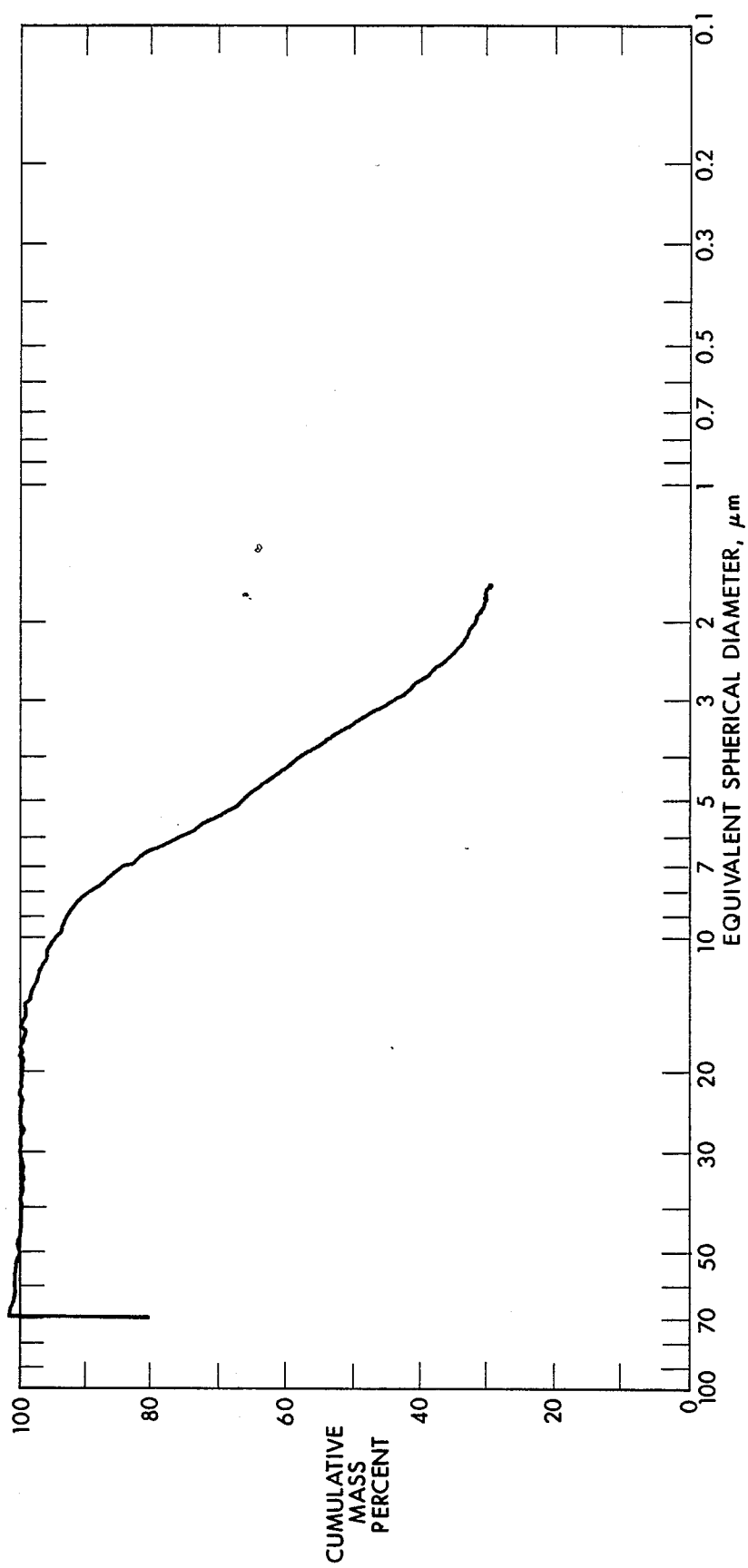
FIG. 3 is a PSD curve for the product of Example 3 herein.

A mixture containing 63 grams of a water-washed grey kaolin as described in Example 1, 60 g of a 45% commercial sodium aluminate/water solution (VSA-45, Vinings Industries, Atlanta, Ga.) and an additional 1377 grams of water was heated to 240° C. in a 2 liter Parr high pressure reactor and the 240° C. temperature maintained with stirring at 2500 rpm for 50 minutes. The reactor was cooled and the product treated as described in Example 1. The pulverized aggregate was analyzed for changes in particle size and compared to the starting material. The resulting product was significantly altered from its original state, as will be seen from the PSD curve in FIG. 3 as compared to the PSD curve of the feed material in FIG. 2. This aggregated material has an average particle size of 3.4μ as compared to an average particle size of <0.25μ for the feed material.

EXAMPLE 3

A series of experiments were carried out using a grey water-washed grey kaolin whose particle size is 97% <1μ in which the total solids in the 2 liter Parr high pressure reactor vessel was varied from 4%-10% solids. Three such slurries were used, as seen in Table 2. The reaction temperature and reaction time in all three cases was 200° C. for 30 minutes with a mixer speed of 500 rpm. The reactions were carried out as described in Example 1. In each case, the resultant pulverized product gave a particle size distribution curve sufficiently different from the feed material, to indicate a coarsening in particle size, i.e., aggregation (Table 3). It is important to note that the degree of aggregation can be controlled by the percent solids in the reactor vessel. The higher the percent solids in the range 4%-10%, the larger or more aggregated is the resulting product.

TABLE 2

| | Slurry Compositions | | | |
| | Solids | Clay | VSA 38* | Water |
| --- | --- | --- | --- | --- |
| A | 4% | 36 g | 63.2 g | 1400.8 g |
| B | 8% | 72 g | 126.4 g | 1301.6 g |
| C | 10% | 90 g | 157.9 g | 1252.1 g |

*VSA 38, Vining Industries, Atlanta, Georgia 38% Sodium Aluminate

TABLE 3

| Slurry | | Brightness | TiO2 | Fe2O3 | Recovery |
|---|---|---|---|---|---|
| C. | 10% solid | 84.5 | .79 | .67 | 124% |
| B. | 8% solid | 84.0 | .83 | .82 | 130% |
| A. | 4% solid | 83.9 | .89 | .82 | 108% |
| Feed | | 82.5 | 1.02 | .93 | — |

| | Particle Size Distribution (PSD) | | | | | |
|---|---|---|---|---|---|---|
| Slurry | Avg. μ | <10μ | <5μ | <2μ | <1μ | <.5μ | <.25μ |
| C. | .47 | 100 | 99 | 96 | 89 | 59 | 8 |
| B. | .51 | 100 | 99 | 97 | 89 | 48 | 20 |
| A. | .28 | 100 | 99 | 91 | 88 | 60 | 46 |
| Feed | — | 100 | 100 | 99 | 97 | 90 | 76 |

EXAMPLE 4

Sodium Silicate + Sodium Aluminate + Kaolin

The role of sodium aluminate in hydrothermal aggregation was further shown by examining mixtures of sodium silicate, sodium aluminate, and kaolin.

The sodium silicate + sodium aluminate ("glue") were mixed in a silica-to-alumina ratio of 2:1. The "clay-to-glue" ratio was varied from 90/10 to 60/40. The reactor feed solids were varied from 2% to 12%. The reactor was operated at 500 rpm and 200° C. for 30 minutes. Aggregation was monitored by particle size:

TABLE 4

Effects of Sodium Silicate plus Sodium Aluminate Glue on 0.25μ

| | Clay/Glue Ratio | | | |
|---|---|---|---|---|
| Solids | 90/10 | 80/20 | 70/30 | 60/40 |
| 2% | 61 | 61 | 58 | 61 |
| 4% | 56 | 68 | 63 | 62 |
| 6% | 61 | 64 | 64 | 64 |
| 8% | 63 | 60 | 66 | 48 |
| 10% | 60 | 62 | 55 | 31 |
| 12% | 59 | 63 | 48 | 23 |

Feed = 74% < 0.25μ

It is to be noted that all combinations of clay and glue became coarser than the feed clay. Increasing glue and-/or solids gave increasingly coarse particle sizes.

EXAMPLE 5

A separate experiment investigated the effects of temperature on aggregating kaolin with sodium silicate plus sodium aluminate. The reactor feed was 70/30 clay/glue ratio and 6% total solids. The mixer speed was 2500 rpm, and the residence time was 60 minutes. Aggregation occurred at temperatures as low as 90° C., which is well below the temperatures of the prior art. Results are shown in Table 5.

TABLE 5

| Temperature | Average Size |
|---|---|
| 90° C. | 2.1μ |
| 110° C. | 1.6μ |
| 130° C. | 1.2μ |
| 170° C. | 0.9μ |

EXAMPLE 6

A mixture of 63 grams of a water-washed kaolin whose particles are 90% <0.5μ, and a GE brightness of 78, 71 grams of a commercial sodium silicate having a specific gravity of 1.40 and a ratio of $SiO_2/Na_2O$ of 3.26, 69 grams of VSA 45 (see Example 1) and 1297 grams of water were reacted at 130° C. for 2 hours under constant mixing at 2500 rpm in a 2 liter Parr high temperature reactor vessel. The product was treated as in Example 1. The resulting pulverized product had a GE brightness of 88.4 vs 78 for the feed material and a change in particle size at 1μ from 89% <1μ to 54% <1μ. The aggregated product has utility in paint, paper filling and paper coating and polymers.

EXAMPLE 7

Samples of products prepared as in Examples 4 and 5 were evaluated to compare the effects of clay/glue ratios and reactor feed solids on light scattering properties. The reactor feed solids varied from 2% to 12% in 2% increments. The clay-to-glue ratio varied from 60/40 to 90/10 in 10% increments. The samples evaluated are shown in Table 6.

Figure 4:
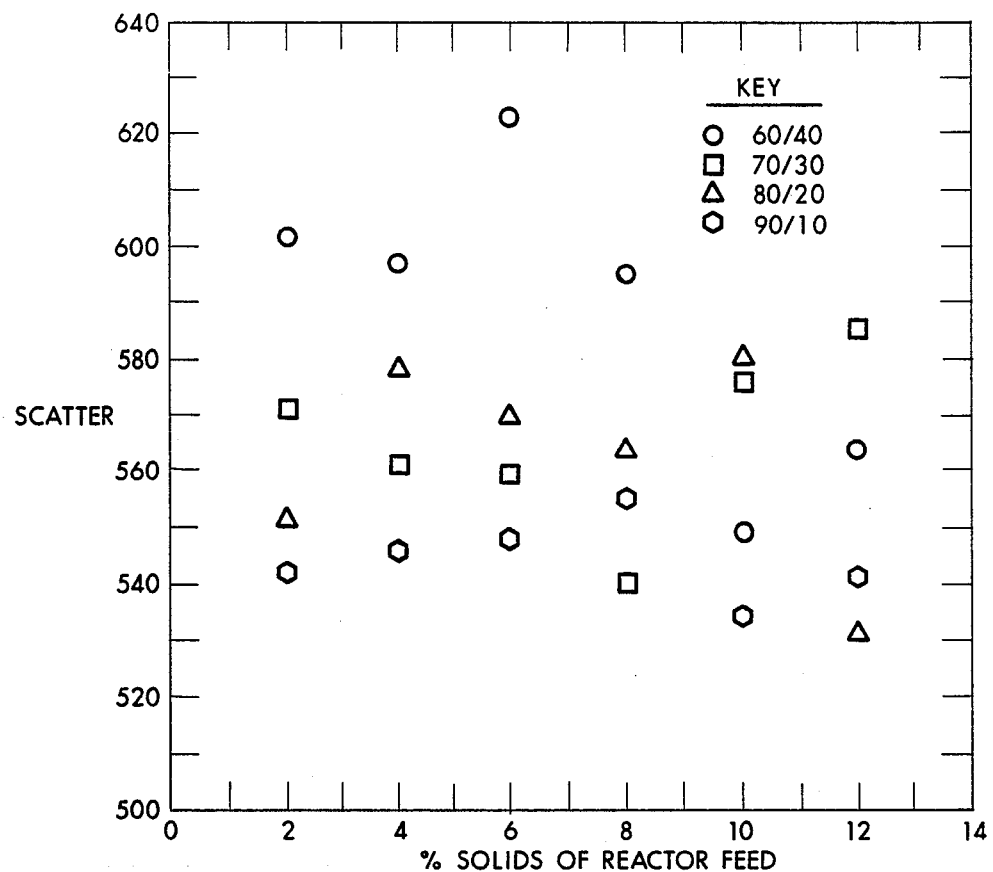
FIG. 4 is a graph depicting the effects of reactor feed solids on light scattering properties for pigments in accordance with the invention.

The results listed in Table 6 and graphically represented in FIG. 4 show that in general the 60/40 clay/glue ratio gives the highest light scatter. The blend containing the least amount of glue (90/10) gives the lowest light scatter.

TABLE 6

| Samole # | % Solids Reactor Feed | Clay/Glue Ratio | Brightness | TiO2 |
|---|---|---|---|---|
| 1 | 2 | 60/40 | 89.6 | 0.64 |
| 2 | 4 | | 89.9 | 0.64 |
| 3 | 6 | | 89.2 | 0.63 |
| 4 | 8 | | 85.5 | 0.63 |
| 5 | 10 | | 82.2 | 0.59 |
| 6 | 12 | | 81.9 | 0.58 |
| 7 | 2 | 70/30 | 89.2 | 0.69 |
| 8 | 4 | | 89.0 | 0.77 |
| 9 | 6 | | 89.4 | 0.72 |
| 10 | 8 | | 87.3 | 0.71 |
| 11 | 10 | | 86.5 | 0.67 |
| 12 | 12 | | 86.7 | 0.74 |
| 13 | 2 | 80/20 | 88.9 | 0.74 |
| 14 | 4 | | 88.9 | 0.84 |
| 15 | 6 | | 89.1 | 0.84 |
| 16 | 8 | | 88.8 | 0.84 |
| 17 | 10 | | 88.4 | 0.84 |
| 18 | 12 | | 88.0 | 0.83 |
| 19 | 2 | 90/10 | 89.0 | 0.77 |
| 20 | 4 | | 89.0 | 0.74 |
| 21 | 6 | | 88.9 | 0.77 |
| 22 | 8 | | 88.9 | 0.84 |
| 23 | 10 | | 89.4 | 0.87 |
| 24 | 12 | | 89.2 | 0.80 |
| Control | | | 83.5 | 0.99 |

TABLE 7

| Sample | Scatter[2] @ 10% Loading | Normalized[3] | Absorption[4] @ 100% |
|---|---|---|---|
| Control | 533 | 537 | 92.4 |
| #1 | 598 | 602 | 23.0 |
| #2 | 593 | 597 | 23.9 |
| #3 | 618 | 623 | 29.4 |
| #4 | 591 | 595 | 49.0 |
| #5 | 545 | 549 | 59.2 |
| #6 | 560 | 564 | 66.2 |
| #7 | 567 | 571 | 30.0 |
| #8 | 557 | 561 | 28.2 |
| XP581 | 678 | 683 | 13.7 |
| Alphatex ®[1] (5370-S) | 675 | 680 | 13.6 |
| Control | 533 | 536 | 91.8 |
| #9 | 556 | 559 | 26.3 |
| #10 | 537 | 540 | 32.6 |
| #11 | 573 | 576 | 44.9 |
| #12 | 582 | 585 | 58.7 |
| #13 | 548 | 551 | 32.7 |
| #14 | 575 | 578 | 28.1 |
| #15 | 567 | 570 | 27.3 |
| #16 | 561 | 564 | 32.1 |
| XP581 | 682 | 686 | 16.9 |
| Alphatex ® | 676 | 680 | 13.4 |

TABLE 7-continued

| Sample | Scatter[2] @ 10% Loading | Normalized[3] | Absorption[4] @ 100% |
|---|---|---|---|
| (5370-S) Control | 522 | 529 | 89.2 |
| #17 | 573 | 580 | 31.2 |
| #18 | 524 | 531 | 35.3 |
| #19 | 535 | 542 | 33.0 |
| #20 | 539 | 546 | 31.8 |
| #21 | 541 | 548 | 30.7 |
| #22 | 548 | 555 | 30.5 |
| #23 | 527 | 534 | 37.0 |
| #24 | 534 | 541 | 31.7 |
| XP581 | 687 | 696 | 15.6 |
| Alphatex ® (5370-S) | 671 | 680 | 13.5 |

[1] Alphatex is the calcined kaolin clay product of ECCA, Inc., assignee of the present application.
[2,3,4] See commonly assigned U.S. Pat. No. 4,820,554 for further details of these terms and measurement techniques.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for forming a hydrothermally aggregated kaolin clay pigment, comprising: preparing an aqueous slurry of particulate kaolin clay and sodium aluminate, having a total solids concentration of from about 2 to 25% by weight, the weight ratio between the particulate kaolin clay and the sodium aluminate being greater than 1; and hydrothermally treating said slurry in a closed system to form aggregates of adherent kaolin platelets.

2. A method in accordance with claim 1, wherein said hydrothermal treatment is effected at temperatures of from about 50° to 300° C.

3. A method in accordance with claim 2, wherein said hydrothermal treatment is effected at temperatures of from about 90° to 200° C.

4. A method in accordance with claim 2, wherein said slurry is subjected to mixing during said hydrothermal treatment.

5. A method in accordance with claim 2, wherein said hydrothermal treatment is carried out for from about 0.1 to 8 hours.

6. A method in accordance with claim 5, wherein said hydrothermal treatment is carried out for from about 0.1 to 2 hours.

7. A method in accordance with claim 1, wherein said slurry further includes sodium silicate.

8. A method in accordance with claim 7, wherein the molar ratio between said sodium aluminate, expressed as equivalent $Al_2O_3$ and sodium silicate, expressed as equivalent $SiO_2$ is from about 1:2 to 2:1.

9. A method in accordance with claim 1, further including recovering and drying said aggregates.

10. A method in accordance with claim 1 or 7, wherein said hydrothermal treatment is conducted in the presence of an oxidizing atmosphere.

11. A method in accordance with claim 1 or 7 wherein said hydrothermal treatment is conducted in an atmosphere enriched with gaseous oxygen.

12. A method for forming a hydrothermally aggregated and brightened kaolin clay pigment from a low brightness particulate feed kaolin, comprising: preparing an aqueous slurry of said particulate feed kaolin and sodium aluminate, having a total solids concentration of from about 2 to 25% by weight, the weight ratio between particulate feed kaolin and the sodium aluminate being greater than 1; and hydrothermally treating said slurry in a closed system to form brightened aggregates of adherent kaolin platelets.

13. A method in accordance with claim 12, wherein said hydrothermal treatment is effected at temperatures of from about 50° to 300° C.

14. A method in accordance with claim 13, wherein said hydrothermal treatment is effected at temperatures of from about 90° to 200° C.

15. A method in accordance with claim 13, wherein said slurry is subjected to mixing during said hydrothermal treatment.

16. A method in accordance with claim 13, wherein said hydrothermal treatment is carried out for from about 0.1 to 8 hours.

17. A method in accordance with claim 16, wherein said hydrothermal treatment is carried out for from about 0.1 to 2 hours.

18. A method in accordance with claim 12, wherein said particulate feed kaolin comprises a grey kaolin.

19. A method in accordance with claim 12, wherein said slurry further includes sodium silicate.

20. A method in accordance with claim 19, wherein said feed comprises a grey kaolin.

21. A method in accordance with claim 19, wherein the molar ratio between said sodium aluminate, expressed as equivalent $Al_2O_3$ and sodium silicate, expressed as equivalent $SiO_2$ is from about 1:2 to 2:1.

22. A method in accordance with claim 12, further including recovering and drying said aggregates.

23. A method in accordance with claim 12 or 19, wherein said hydrothermal treatment is conducted in the presence of an oxidizing atmosphere.

24. A method in accordance with claim 12 or 19 wherein said hydrothermal treatment is conducted in an atmosphere enriched with gaseous oxygen.

* * * * *